Jan. 20, 1970 R. J. KOERNER ET AL 3,491,308

MAGNETIC FILM AMPLIFIER

Filed Feb. 17, 1967 2 Sheets-Sheet 1

INVENTOR.
RICHARD H. FULLER
RALPH J. KOERNER
ANTHONY J. KOLK JR.
BY Joseph Dwyer
ATTORNEY Jan. 20, 1970 R. J. KOERNER ET AL 3,491,308

MAGNETIC FILM AMPLIFIER

Filed Feb. 17, 1967 2 Sheets-Sheet 2

INVENTOR.
RICHARD H. FULLER
RALPH J. KOERNER
ANTHONY J. KOLK JR.
BY Joseph R Dwyer
ATTORNEY

United States Patent Office 3,491,308
Patented Jan. 20, 1970

3,491,308

MAGNETIC FILM AMPLIFIER

Ralph J. Koerner, Canoga Park, Anthony J. Kolk, Jr., Palos Verdes, and Richard H. Fuller, Sherman Oaks, Calif., assignors to Singer-General Precision, Inc., a corporation of Delaware Filed Feb. 17, 1967, Ser. No. 618,271
Int. Cl. H03f 9/00
U.S. Cl. 330—63 7 Claims

ABSTRACT OF THE DISCLOSURE

A sensitive power amplifier of low amplitude binary signals, such as may be produced by an interrogated woven wire magnetic memory matrix. The weak binary signal of a particular polarity is coupled through a coil to a conductor having an anisotropic magnetic thin film coating and nucleates a small magnetic domain of corresponding polarity in the film. Additional fields applied to the magnetic film force the small domain to grow, so that upon interrogation, a large magnetic domain is detected to produce an amplified output signal into the output windings, while simultaneously, a pulse is generated back into the output coil which is capable of rewriting the data into the interrogated memory matrix.

Background of the invention

The invention relates to signal amplifiers and, in particular, to a magnetic thin film amplifying device in which the amplification comprises the growth or expansion of a small magnetic domain that has been nucleated in a magnetic thin film. The invention has particular application where a low signal requires amplification and where extreme sensitivity, high radiation tolerance and high speed are required. Thus, the invention is especially useful in conjunction with thin film memories, such as are used for storing binary information for digital systems. The invention will be disclosed in connection with a plated wire memory matrix of the woven type, but it is to be understood that it is equally capable of use with other memory devices.

In the utilization of woven plated wire memories, it has heretofore been necessary to amplify the output signals with conventional semiconductor circuitry which is relatively large and expensive. The present invention eliminates the need for, and replaces, such semiconductor circuitry, and furthermore, inasmuch as magnetic materials are highly insensitive to radiation, such a magnetic thin film amplifier increases relability and radiation tolerances of the memory systems.

Summary of the invention

A thin anisotropic magnetic coating plated on an electrical conductor with the easy axis of magnetization running longitudinally of the conductor is employed as an amplifier of small binary input signals which are magnetically coupled to the coating by solenoid coils connected to the output digit lines of a plated wire memory matrix, or the like, by applying a small sensitizing current through the electrical conductor to generate a circumferential field which tends to force the magnetic domains away from the easy axis. The input signal, which is of very low amplitude, may then easily rotate a small area of these "sensitized" magnetic domains into a polarity that is dependent upon the polarity of the input signal. An additional drive current applied through solenoid windings around the magnetically coated conductor generates a magnetic field, which by itself, will not rotate a magnetic domain, but which will provide growth to the small nucleated domain generated by the input signal. Interrogation is accomplished by applying a large pulse of opposite polarity through the drive winding, whereby the polarity shift of the magnetic domains may be sensed by additional output windings. Concurrently, a current pulse is generated back into the digit windings of the memory matrix, so that the binary information may be rewritten into the memory matrix. In addition to the readout and rewrite functions, the large interrogation pulse is of sufficient amplitude to return all magnetic domains to the original state and polarity, so that the amplifier is ready to accept new information to be amplified.

Description of the drawings

In the drawings, which illustrate a preferred embodiment of the invention.

Before beginning a description of the drawings, it should be pointed out that the phenomena of nucleation in thin films and magnetic domain growth therein is not new. Reference is made to an article appearing in the Journal of Applied Physics, volume 29, Number 3, of March 1958, entitled "Magnetization Processes; Reversals and Losses" and sub-titled "Domain Wall Motion in Metals," by R. W. De Blois, which reviews domain wall velocity and domain wall growth.

Figure 1:
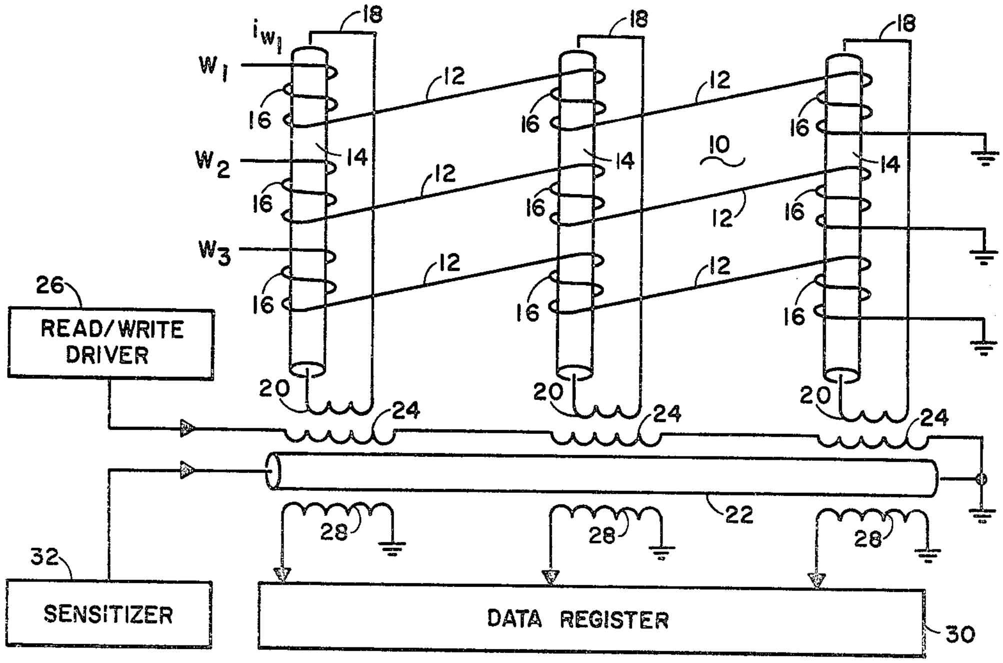
FIGURE 1 is a schematic illustration of a magneic memory matrix coupled to the thin magnetic film amplifier.

Turning now to FIGURE 1, a woven plated wire memory, as indicated in its entirety by numeral 10, comprises a plurality of insulated word lines 12 woven around a plurality of magnetically plated wires 14. In the schematic illustration the word lines 12 are shown to be coiled around the plated wires 14, whereas in the practical embodiment, the coils are preferably formed by a weaving operation. Magnetic material on the surface of plated wires 14 is an anisotropic magnetic coating with the easy direction of magnetization being circumferential of the wire to form a closed magnetic loop. A bit of magnetic information may be stored in the cylindrical magnetic volume indicated, for example, at 16, by the application of currents of appropriate polarity through the word line 12 and plated wires 14 which rotates the magnetization vector, or domain, through the hard, or axial, direction into a selected polarity in the easy direction. The polarity of the magnetic domain resting in the easy direction represents either a binary ZERO or ONE.

To interrogate a woven wire matrix, a "word current" is applied to the word lines 12 and a resulting "digit current" will be generated in the plated wires 14 of a polarity depending upon the polarity of the magnetic domain stored in the cylindrical volume 16 of the magnetic material. This digit current transmitted through digit line 18 indicates, by its polarity, the state of the binary bit, and being of a very small amplitude, must be amplified.

As shown in FIGURE 1, a woven plated memory matrix 10 comprising three mgnetically plated wires 14 are connected so that the digit lines 18 are coupled to the plated wire amplifier element 22 by a digit winding 20, which is circumferntially wound about the plated wire amplifier element 22. Because the digit current produced by the interrogation of the plated wires in matrix 10 is extremely small in order to produce a relatively high flux density in a small area of the magnetic coating of the amplifier element 22.

A second circumferential winding, the drive winding 24, is wound around amplifier element 22 and over digit winding 20 and is electrically insulated therefrom. Current applied through drive winding 24 will generate a longitudinal magnetic flux which provides growth to the small nucleated magnetic domains produced by excitation of the digit winding 20, and drive winding 24 must therefore have a physical length approximately equal to the desired length of the magnetic vector to be produced in the amplifier element 22, which is, of course, determined by the amount of amplification required. Drive winding 24 is conected to a read/write driver 26, which supplies currents of various polarities and amplitudes to the drive winding, as will be hereinafter explained in detail under the section on "Operation."

A third circumferntial winding having a physical length approximately equal to the length of the drive winding 24 is applied to the plated wire amplifier element 22 and is designated the data winding. Data winding 28 senses the flux change in the amplifier element 22 and provides an output signal for use in subsequent circuitry, such as a data register 30.

The plated wire amplifier element 22 is comprised of an electrically conductive wire coated with a thin square loop metallic magnetic film in the presence of a longitudinal or axially magnetic field, so that the resulting coating is anisotropic with the preferred or easy axis of magnetization running longitudinally or axially of the wire. The magnetic film is one of the many materials exhibiting re-entrant hysteresis characteristics, in which the application of a subthreshold magnetic field will switch the magnetic remanence from one stable state to the other only after the application of a small starting field that exceeds the switching threshold. In the invention, the subthreshold field is supplied by the drive winding 24 and the small starting field by the digit winding 20. A sensitizing field, which will be fully explained under the section on "Operation," is applied by a sensitizer 32, which provides a current pulse through the electrically conductive wire of the plated wire amplifier element 22 and thus generates a circumferential magnetic field which tends to force the axially oriented magnetic domains toward the hard axis of magnetization, where the domains may be turned toward the opposite easy axis by the small flux produced by digit winding 20.

Operation

Figure 2:
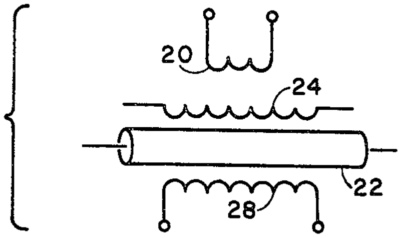
FIGURE 2 is an enlarged schematic illustration of the coupling between the output sense line of the memory matrix and the magnetic amplifier.
Figure 3:
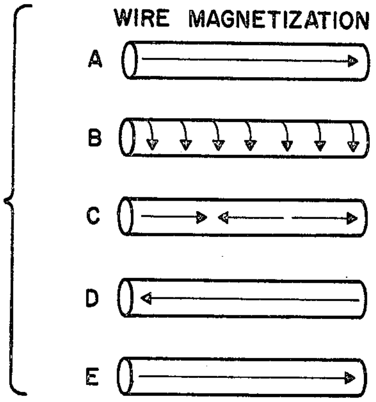
FIGURE 3 is an illustration showing portions of the thin magnetic film amplifier element with the magnetization vectors, or domains, during various stages of operation.

FIGURE 2 illustrates a portion of FIGURE 1 and shows an enlarged section of the plated wire amplifier element 22 with schematic representations of a digit winding 20, a drive winding 24 and a data winding 28. Aligned directly below FIGURE 2 is FIGURE 3 which schematically illustrates the positions and directions of the magnetic vectors in the plated wire amplifier element 22 during the various phases of the operation, and FIGURE 4 illustrates typical waveforms of the signals through the various windings which produce the necessary fields to produce the magnetic domain positions and directions shown in FIGURE 2.

In order to achieve signal amplification it is obviously necessary that a weak input signal be operated upon in some manner to obtain a stronger amplified output signal. Electrical currents produced by the interrogation of the woven plated wire memory matrix 10 of FIGURE 1 will produce a very weak electrical current through the digit winding 20. Normally, the nucleation of a magnetic domain in an anisotropic magnetic medium requires a relatively high current. Thus, under normal conditions, the current supplied by the digit winding 20 would be completely inadequate. This difficulty has been overcome by sensitizing the magnetic coating on the amplifier element 22 by the introduction of a current through the electrical conductor of the amplifier element 22; this generates a circumferential magnetic field and tends to rotate the magnetic domains from the preferred axis of FIGURE 3A toward the hard axis of magnetization, as shown in FIGURE 3B. When the magnetic domains are positioned in this direction, a very small longitudinal field, such as may be supplied by a small current through digit winding 20, will be sufficient to nucleate, or turn, a correspondingly small area of magnetic domains from their original orientation into the switched condition, as shown in FIGURE 3C. This nucleated magnetic domain is then "grown" to turn a larger portion of the domain in the amplifier element 22 by the application of a longitudinal or axial magnetic field generated by an additive current through drive winding 24, as shown in FIGURE 3D. rIGURE 3E shows that the magnetic domain has returned to its orignial condition upon interrogation of the amplifier element 23 by a large reverse current pulse through drive winding 24.

Figure 4:
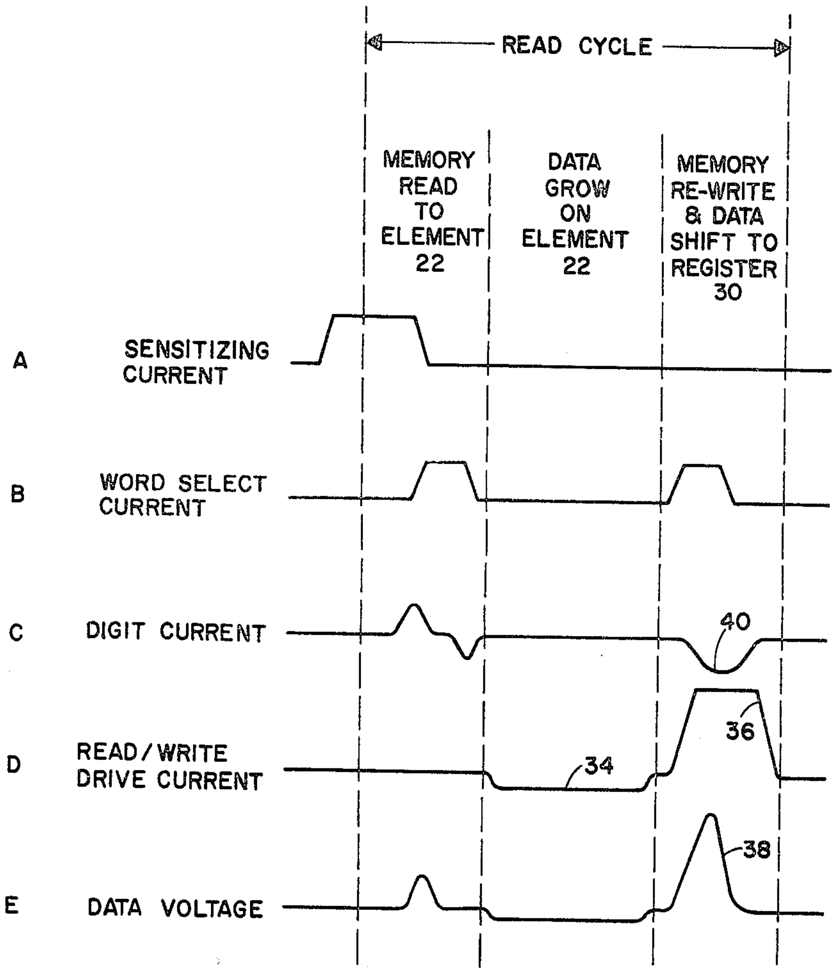
FIGURE 4 illustrates a series of waveforms of currents and voltage which appear at various points during the operation of the invention.

In FIGURE 4, which shows the sequence of applied fields, the first occurrence in the operation of the amplifier is the application of a sensitizing current, FIGURE 4A, applied from sensitizer 32 through the electrically conductive core of the amplifier element 22. The application of this current, which forces a circumferential field around the amplifier element 22, forces the magnetic domains from the normal easy axis of magnetization into an unstable direction and produces the sensitization schematically illustrated in FIGURE 3B. Upon sensitization of the amplifier element 22, a word select current, FIGURE 4B, is applied to the word lines 12 of the memory matrix 10, and a small current pulse having a polarity sequence dependent upon the direction of the magnetic domains stored in the cylindrical volume 16 will be produced in the digit winding 20 as shown in FIGURE 4C. If the digit current is of a polarity which tends to produce a magnetic field opposing the original magnetization of the amplifier element 22, as shown in FIGURE 3A, a small area of magnetic domains will be nucleated directly beneath the digit winding 20, as shown in FIGURE 3C. Upon completion of the word select current of FIGURE 4B, read/write driver 26 is activated to produce an additive current 34 through drive winding 24, FIGURE 4D, and this current generates a magnetic field which is sufficient to turn a large area of magnetic domains, after a portion has been nucleated, to produce growth of the nucleated domain. The magnetization of the amplifier element 22 under drive winding 24 is now completely reversed, as shown in FIGURE 3D.

Interrogation of the amplifier element 22 is accomplished by the application of a large reverse field produced by a large current pulse 36 from read/write driver 26 through driver windings 24, as shown in FIGURE 4D. This pulse is of sufficient amplitude to return the magnetic domains of the amplifier element 22 to their original condition without the benefit of sensitization, which return produces an output data voltage pulse 38 in data winding 28, as shown in FIGURE 4E.

Upon return of the magnetic domains to the original condition, the flux lines will cut the digit winding 20 and induce therein a pulse of digit current 40, as shown in FIGURE 4C. This current pulse 40 is transmitted through the digit lines 18 and, if a current pulse is simultaneously applied through the word lines 12 of the matrix 10, the information originally interrogated in volume 16 of the matrix 10 may be rewritten into the plated wire memory matrix to effectively provide a non-destructive matrix memory.

In the above discussion it has been assumed that the digit current through digit winding 20 is of a polarity that will nucleate a small area of magnetic domains in the material of amplifier element 22. If it is found that a particular magnetic volume in the matrix 10 contains a bit of data (e.g., a binary ZERO) which produces a current in digit winding 20 that adds to the existing polarity of magnetization of the amplifier element 22, the magnetization domains of the amplifier element 22 will not become nucleated and, upon removal of the sensitizing current applied through the conductor of amplifier element 22, the magnetic domains will return to their original direction, as shown in FIGURE 3A. Thus, upon application of the reverse interrogation drive current 36, there will be no domain rotation and the data voltage signal 38 of FIGURE 4E will be of a much smaller amplitude, due only to the coupling that exists between the drive winding 24 and the data winding 28.

What is claimed is:

1. A signal amplifier for amplifying electrical signals in the form of currents of a first or second polarity, said amplifier comprising:

a magnetic element having a first and a second easy direction of magnetism and at least one hard direction of magnetism;

input means coupled to said element for generating an input magnetic field for nucleating the magnetic domains in a small area in said element from the first easy direction of magnetism to a particular one of said easy directions determined by the polarity of the input signal;

sensitizing means coupled to said element for generating a magnetic field toward a hard direction of magnetism for facilitating nucleation of domains by said input means;

growth means coupled to said element for generating a magnetic growth field, larger than said input magnetic field, in the second easy direction of magnetism, said growth field having sufficient intensity to align the magnetic domains in the area associated with said growth field only if a nucleated area produced by said input means is aligned in the second easy direction of magnetism; and output means coupled to said element for sensing the alignment of the magnetic domain after removal of the input magnetic field and the growth field.

2. The signal amplifier, as claimed in claim 1, wherein said magnetic element is an anisotropic magnetic material coated upon the surface of an electrical conductor, said material having the easy direction of magnetism parallel to the lonigtudinal axis of said conductor.

3. The signal amplifier as claimed in claim 1, wherein said sensitizing means includes means for applyng an electrical current through said electrical conductor for generating a magnetic field toward the circumferential hard direction of magnetism in said magnetic material.

4. The signal amplifier, as claimed in claim 3, wherein said input means includes a first electrical conductor adjacent said magnetic material for generating a magnetic field for nucleating a small area of magnetism in said material in a particular easy direction determined by the polarity of the input signal, and said growth means including a second electrical conductor adjacent said magnetic material and said first electrical conductor for generating a magnetic field over a larger area of magnetism in said material.

5. The amplifier, as claimed in claim 4, wherein the growth means includes means for interrogating the magnetic element by the application of a current pulse through said second electrical conductor, said current pulse being of a polarity which generates a magnetic field toward the first easy direction of magnetization for returning to said first directions the magnetic domains which were nucleated and grown into the second easy direction of magnetization.

6. The amplifier, as claimed in claim 5, wherein the interrogation current pulse applied by said growth means is inductively coupled into the input means for generating a rewrite signal to the source of input signals.

7. The amplifier, as claimed in claim 6, wherein said input means, said growth means, and said output means include individual and mutually insulated multiturn solenoid windings circumferentially positioned around said magnetic element.

References Cited

UNITED STATES PATENTS 3,071,756 1/1963 Pugh ------------ 307—298 X

OTHER REFERENCES

IBM Technical Disclosure Bulletins: (1) vol. 2, No. 5, February 1960, p. 78; (2) vol. 7, No. 1, June 1964, p. 80—(1) entitled "Rotational Thin Film Magnetic Amplifier" by Stuckert, and (2) entitled "Sense Amplifier" by Levi.

NATHAN KAUFMAN, Primary Examiner

U.S. Cl. X.R.

330—207